(No Model.) 2 Sheets—Sheet 1.
C. W. CRANNELL.
CUTTING APPARATUS FOR MOWERS OR HARVESTERS.
No. 428,077. Patented May 20, 1890.
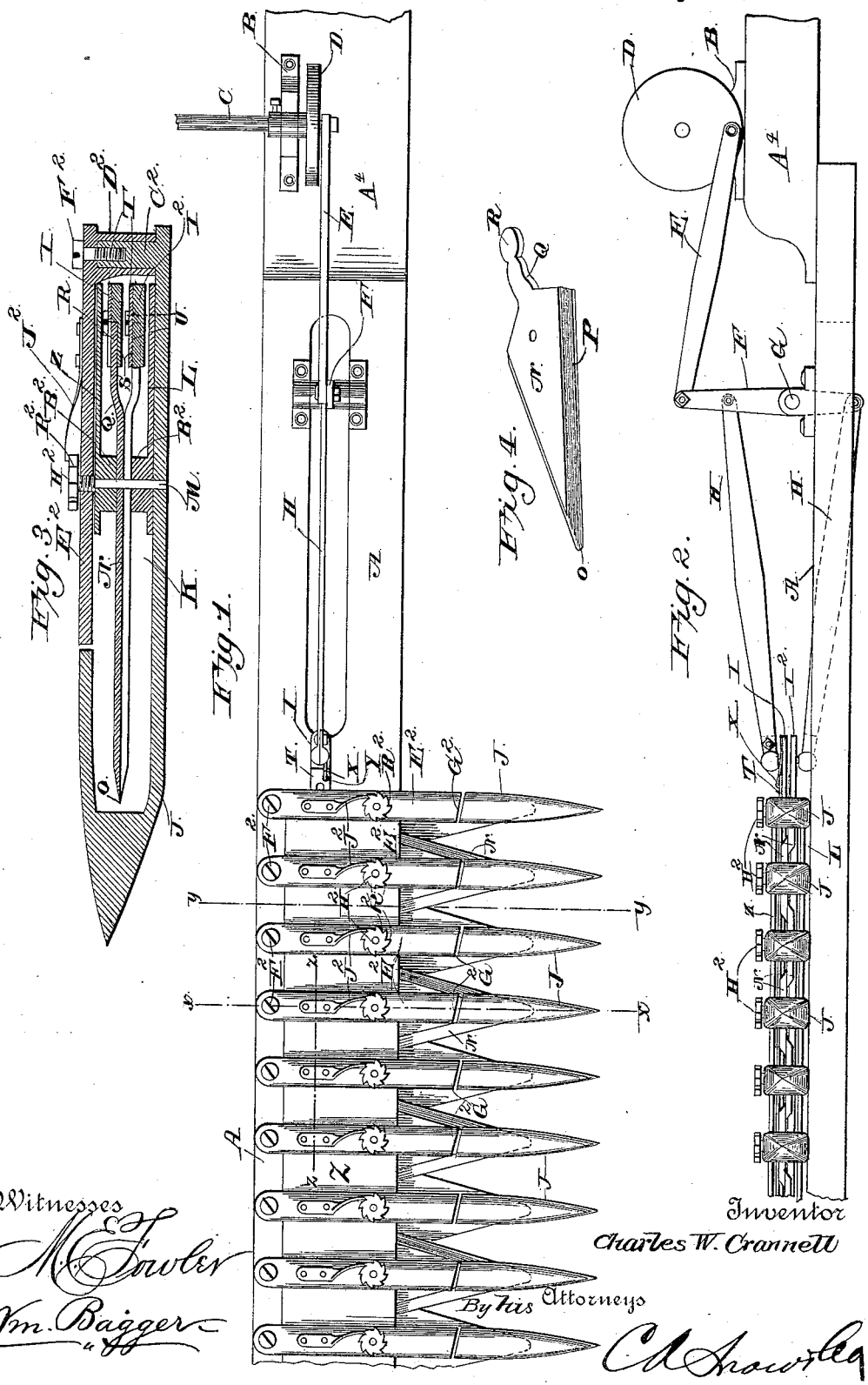
Witnesses
M. Fowler
Wm. Bagger
Inventor
Charles W. Crannell
By his Attorneys (No Model.) 2 Sheets—Sheet 2.
C. W. CRANNELL.
CUTTING APPARATUS FOR MOWERS OR HARVESTERS.
No. 428,077. Patented May 20, 1890.
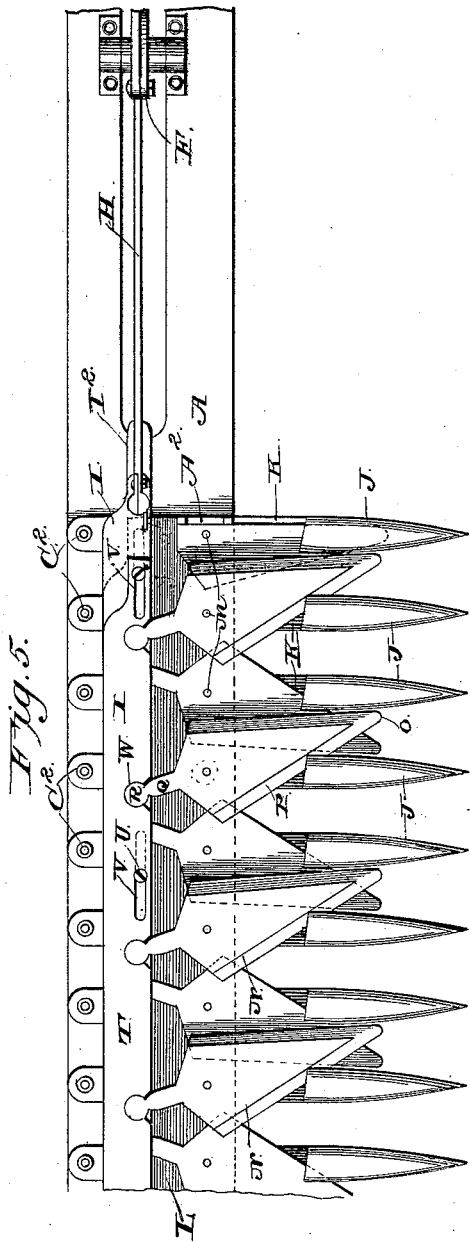
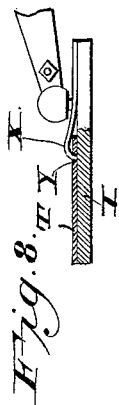
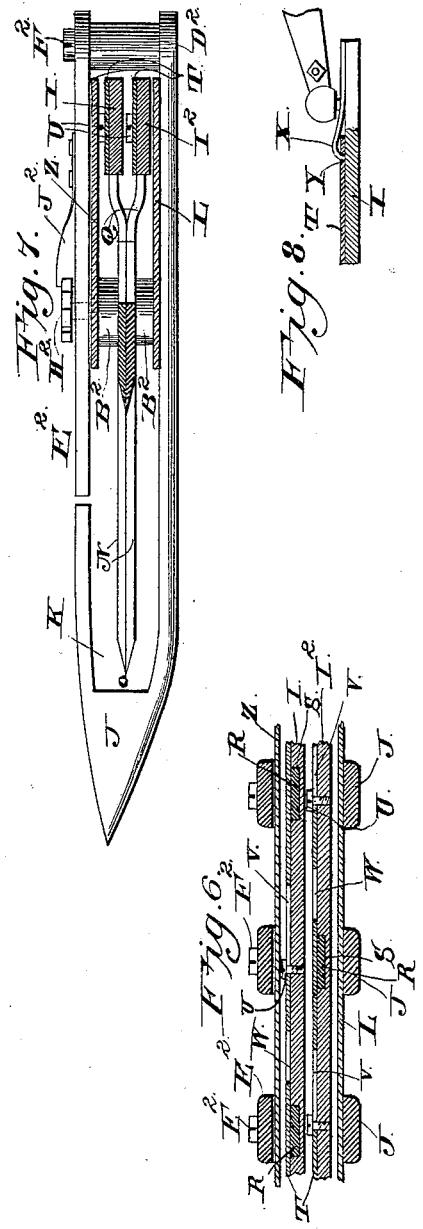
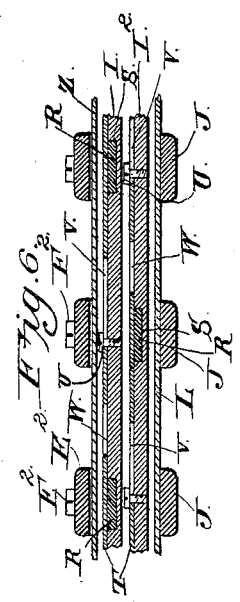
Witnesses
M. C. Fowler
Wm. Bagger
Inventor
Charles W. Crannell
By his Attorneys

UNITED STATES PATENT OFFICE.

CHARLES W. CRANNELL, OF OBERLIN, KANSAS, ASSIGNOR OF ONE-HALF TO TULLY SCOTT, OF SAME PLACE.

CUTTING APPARATUS FOR MOWERS OR HARVESTERS.

SPECIFICATION forming part of Letters Patent No. 428,077, dated May 20, 1890.

Application filed March 8, 1889. Serial No. 302,480. (No model.)

*To all whom it may concern:*

Be it known that I, CHARLES W. CRANNELL, a citizen of the United States, residing at Oberlin, in the county of Decatur and State of Kansas, have invented a new and useful Improvement in Cutting Apparatus for Mowers and Harvesters, of which the following is a specification.

This invention relates to cutting apparatus for mowers and harvesters of that class which are provided with vibrating cutters; and it has for its object to produce a device which shall be simple in construction, and which may be easily operated at a high rate of speed with comparatively slight expenditure of power.

With this end in view the invention consists, primarily, in an improved construction and arrangement of two sets of vibrating cutters, one above the other, the cutters of the upper set being arranged intermediately between those of the lower set, so that they shall coact to produce a shear action.

The invention further consists in certain details in the construction and arrangement of the cutters, and in mechanism for taking up slack which may be caused by wear, all as will be hereinafter fully described, and particularly pointed out in the claims.

In the drawings, Figure 1 is a plan view showing a part of the cutter-bar equipped with my improvement. Fig. 2 is a front view of the same. Fig. 3 is a transverse vertical section taken on the line $x\,x$ in Fig. 1, the finger-bar being omitted. Fig. 4 is a detail view of one of the knives or cutters. Fig. 5 is a plan view, the top plate or cover having been removed. Fig. 6 is a longitudinal vertical section taken on the line $z\,z$ in Fig 1, the finger-bar being omitted. Fig. 7 is a transverse sectional view taken on the line $y\,y$ of Fig. 1, the finger-bar being omitted. Fig. 8 is a detail view showing the catch or device for retaining the sliding cap of one of the knife-operating bars in its closed position.

The same letters refer to the same parts in all the figures.

A designates the finger-bar of a mower or harvester, which extends from the frame-bar $A^4$ of the machine. The latter has a bearing B for a shaft C, to which motion may be transmitted in the usual manner. The front end of the shaft C carries a wheel or disk D, to the face of which is connected the pitman E, the outer end of which is connected pivotally with the upper end of a lever F, mounted upon a rock-shaft G. The lever F has pitmen H attached thereto on opposite sides of and at equal distances from its fulcrum, the outer ends of said pitmen being connected in the usual manner to the reciprocating slide-bars I $I^2$.

Suitably secured to the bar A are the fingers J, which are of ordinary construction, they being provided with recesses K to accommodate the knives or cutters. Mounted and suitably secured upon the rear ends of the fingers is a plate L, through which extend the upwardly-projecting pivotal pins M, one of which rises vertically from each of the fingers J. Upon the pin M of each alternate finger is pivoted one of the knives or cutters N of the lower set. The knives, as will be seen by reference to Fig. 4, are of a shape approximately like an isosceles triangle, their cutting-edges converging to a point O, which is slightly rounded. The inner sides or faces of the knives are flat and smooth and the outer sides have the beveled edges P. From the rear sides or bases of the cutters extend the shanks Q, which are bent slightly outwardly and provided with the circular heads R. The reciprocating slide-bars I $I^2$ are provided with recesses S to receive the head and a portion of the shank of the knives or cutters, which when seated in the said recesses will be vibrated upon their pivots by the reciprocating action of the said slide-bars. The knives or cutters of the lower set, which are mounted upon the pivoting-pins extending upwardly from alternate fingers, are arranged with their inner or flat faces upwardly. Upon the intermediate pivoting-pins are mounted the knives or cutters of the upper set, which are placed with their inner or flat faces downwardly, so as to rest partially upon the flat faces of the cutters of the lower set, as will be clearly seen by reference to Fig. 5. It will thus be seen that each individual cutter will coact with the two adjacent cutters to form shears when the device is operated by the mechanism described.

Each of the reciprocating slide-bars is provided with a sliding cap-plate or cover T, which is secured thereto by means of screws or headed studs U, working in slots V in the said cap-plate, which latter is provided with openings W, adapted to register with the recesses S in the reciprocating slide-bars. It will be seen that when the cap-plates or covers are closed they will serve to cover the recesses S, and thus confine the heads R and shanks Q of the knives or cutters in said recesses, while by simply moving the said cap-plates to one side the recesses S will be uncovered, thus enabling the knives to be lifted off their respective pivots. This construction will be found exceedingly convenient when it is desired to renew or remove the knives for the purpose of sharpening them, inasmuch as any one of the knives of the upper set may be detached without disturbing the rest. The caps or covers T when closed may be retained in position by means of spring-catches X, attached to the inner ends of the slide-bars and adapted to engage notches Y in the said caps or covers.

Z designates a top plate, which is mounted upon shoulders $A^2$, rising from the finger-bar A or from the edges of the outer fingers. This top plate extends rearwardly, so as to cover the upper reciprocating slide-bar I, thus protecting the operating machinery from any objection which might interfere with the operation. The top plate Z also rests upon the upper set of knives or cutters, as will be seen in the drawings. The bottom plate L and top plate Z are provided on their inner sides with bosses or washers $B^2$, surrounding the spindles M and bearing against the outer faces of the knives or cutters, which are thereby maintained in a proper horizontal position for operation.

The rear ends of the fingers J are provided with upwardly-extending studs $C^2$, on which are mounted the tubular sleeves $D^2$, having forwardly-extending arms $E^2$, which are secured upon the said studs by means of screws $F^2$. The front ends of the arms $E^2$ are beveled, as shown at $G^2$, to correspond with the beveled rear ends of the caps of the finger-guards, as will be clearly seen in Fig. 1. The arms $E^2$ are also provided with set-screws $H^2$, adapted to bear against the upper side of the top plate Z, the pressure upon which may be regulated by means of the said set-screws. The heads of the latter are provided with teeth or ratchets $R^2$, adapted to be engaged by spring-pawls $J^2$, suitably mounted upon the arms $E^2$, so as to prevent the said set-screws from working loose after they have been tightened to a sufficient extent. When it shall be desired to loosen the said screws, the spring-pawls may be readily disengaged from the heads of the screws by the pressure of the finger.

The operation of this invention will be readily understood from the foregoing description, taken in connection with the drawings hereto annexed. When the machine is in operation, motion is transmitted to the slide-bars I $I^2$, which are reciprocated in opposite directions, thus vibrating the knives or cutters operated thereby. It will be seen that each of the knives or cutters coacts with the two adjacent cutters to produce a shear action, and that all of the knives or cutters are in consequence thereof at all times in operation to the full extent of their capabilities. There is but little frictional resistance, inasmuch as the only bearing-points of the knives or cutters are against the faces of each other and against the bosses or washers $B^2$. By means of the set-screws $H^2$ the top plate Z may be forced in a downward direction, thereby tightening the knives or cutters and compensating for any slack which may be caused by wear. The different operating parts of the device are at all times easily accessible, it being only necessary to remove the arms $E^2$ or to swing them aside, when the top plate Z may be readily detached. Any of the operating parts may then easily be reached, and any or all of the knives removed for sharpening or other purposes. It will also be seen that in case any one of the knives should break it may be easily replaced. The device is simple in construction, and it may be easily operated at a comparatively great rate of speed, owing to the fact that two sets of vibrating cutters are employed, which vibrate in opposite directions, thus producing a very rapid and effective motion.

I am aware that set-screws have been employed in connection with the reciprocating cutter-bars of harvester cutting apparatus to force the said cutter-bars together for the purpose of compensating for wear, and to prevent the cutting-edges from separation in operation, and I make no broad claim to this feature of my invention, except in its connection with the vibrating knives or cutters.

Having thus described my invention, I claim and desire to secure by Letters Patent—

1. In a cutting apparatus for mowers and harvesters, the combination of the fingers, spindles extending upwardly from the same, a bottom plate having upwardly-extending bosses surrounding the said spindles, the lower vibrating cutters pivoted upon the spindles of alternate fingers, the upper vibrating cutters pivoted upon the spindles of intermediate fingers and resting upon the cutters of the lower set, a top plate having downwardly extending bosses or washers surrounding the spindles, and suitable tightening-screws adapted to bear against the said top plate, substantially as set forth.

2. In a cutting apparatus for mowers and harvesters, the herein-described knives or cutters having rearwardly-extending shanks provided with circular heads, flat and smooth inner sides or faces, and beveled cutting-edges upon the outer sides or faces, in combination with the reciprocating slide-bars having recesses to receive the heads and shanks of the said cutters, and sliding covering-plates having openings adapted to register with the said recesses, substantially as set forth.

3. In cutting apparatus for mowers and harvesters, the combination, with the vibrating knives or cutters, of the reciprocating slide-bars having recesses to receive the heads upon the rear ends of the said knives or cutters, sliding cap-plates or covers having openings to register with said recesses, and spring-catches adapted to engage notches in the said cap-plates or covers, substantially as set forth.

4. The combination of the fingers having upwardly-extending spindles, the vibrating knives or cutters mounted upon the said spindles, as herein described, the reciprocating slide-bars operating the said knives or cutters, studs extending upwardly from the rear ends of the fingers, sleeves mounted upon the said studs and having arms extending forwardly to the rear ends of the finger-bars, a top plate provided with bosses or washers bearing against the upper vibrating cutters, set-screws mounted in the forwardly-extending arms and bearing against the said top plate and having teeth or ratchets formed upon their heads, and spring-pawls engaging the said teeth or ratchets, substantially as and for the purpose set forth.

In testimony that I claim the foregoing as my own I have hereto affixed my signature in presence of two witnesses.

CHARLES W. CRANNELL.

Witnesses:
WM. BAGGER,
JOHN H. SIGGERS.